United States Patent
Gay et al.

(10) Patent No.: US 12,005,028 B2
(45) Date of Patent: Jun. 11, 2024

(54) DISPOSABLE PORT DEVICE FOR CONNECTING A FUNCTIONAL UNIT TO A FLEXIBLE WALL OF A DISPOSABLE CONTAINER AND METHOD OF MANUFACTURING A DISPOSABLE PORT DEVICE

(71) Applicant: Sartorius Stedim Biotech GmbH, Goettingen (DE)

(72) Inventors: Isabelle Gay, Goettingen (DE); Thomas Regen, Goettingen (DE); Marek Hoehse, Goettingen (DE)

(73) Assignee: SARTORIUS STEDIM BIOTECH GMBH (DE)

( * ) Notice: Subject to any disclaimer, the term of this patent is extended or adjusted under 35 U.S.C. 154(b) by 506 days.

(21) Appl. No.: 17/268,505

(22) PCT Filed: Aug. 14, 2019

(86) PCT No.: PCT/EP2019/071877
§ 371 (c)(1),
(2) Date: Feb. 15, 2021

(87) PCT Pub. No.: WO2020/038811
PCT Pub. Date: Feb. 27, 2020

(65) Prior Publication Data
US 2021/0315774 A1 Oct. 14, 2021

(30) Foreign Application Priority Data
Aug. 22, 2018 (FR) ...................... 18/57591

(51) Int. Cl.
*A61J 1/14* (2023.01)
*B01L 3/00* (2006.01)
*B33Y 80/00* (2015.01)

(52) U.S. Cl.
CPC ............... *A61J 1/1475* (2013.01); *B01L 3/50* (2013.01); *B33Y 80/00* (2014.12); *B01L 2300/0627* (2013.01); *B01L 2300/0832* (2013.01)

(58) Field of Classification Search
CPC ..... B01L 2300/0627; B01L 2300/0832; B01L 3/50; B33Y 80/00
See application file for complete search history.

(56) References Cited

U.S. PATENT DOCUMENTS 3,792,799 A 2/1974 Henfrey
6,016,712 A * 1/2000 Warden .............. G01N 33/4905
73/864.22

(Continued)

FOREIGN PATENT DOCUMENTS

| DE | 102015122745 B3 | 1/2017 | |
|---|---|---|---|
| EP | 2179755 | * 10/2008 | ............ A61M 5/148 |
| WO | 2017109420 A1 | 6/2017 | |

OTHER PUBLICATIONS

International Search Report issued in International Application No. PCT/EP2019/071877, Issued Sep. 16, 2019, 3 pages.

*Primary Examiner* — Derek J Battisti
(74) *Attorney, Agent, or Firm* — Dilworth IP, LLC

(57) ABSTRACT

A disposable port device for connecting a functional unit to a flexible wall of a disposable container includes a flange to be connected to the flexible wall of the disposable container and an insert providing or receiving the functional unit. The flange and the insert are separate parts made from different materials with different material characteristics. A method of manufacturing such a disposable port device includes the steps of producing the flange from a first material, producing the insert from a different second material, the first and (Continued)

second materials having different material characteristics, and connecting the insert to the flange.

14 Claims, 2 Drawing Sheets

(56) References Cited

U.S. PATENT DOCUMENTS

| | | | | |
|---|---|---|---|---|
| 2003/0233083 A1* | 12/2003 | Houwaert | ............. | A61J 1/10 |
| | | | | 220/202 |
| 2010/0294693 A1* | 11/2010 | Lynn | ............. | B65D 27/12 |
| | | | | 493/227 |
| 2012/0284991 A1* | 11/2012 | Kusz | ............. | A61M 39/12 |
| | | | | 137/315.01 |
| 2013/0101238 A1* | 4/2013 | Han | ............. | B65D 47/2062 |
| | | | | 383/66 |
| 2015/0345689 A1* | 12/2015 | Selker | ............. | B65B 55/16 |
| | | | | 422/534 |
| 2016/0213565 A1* | 7/2016 | Kijowski | ............. | G01N 9/36 |

* cited by examiner

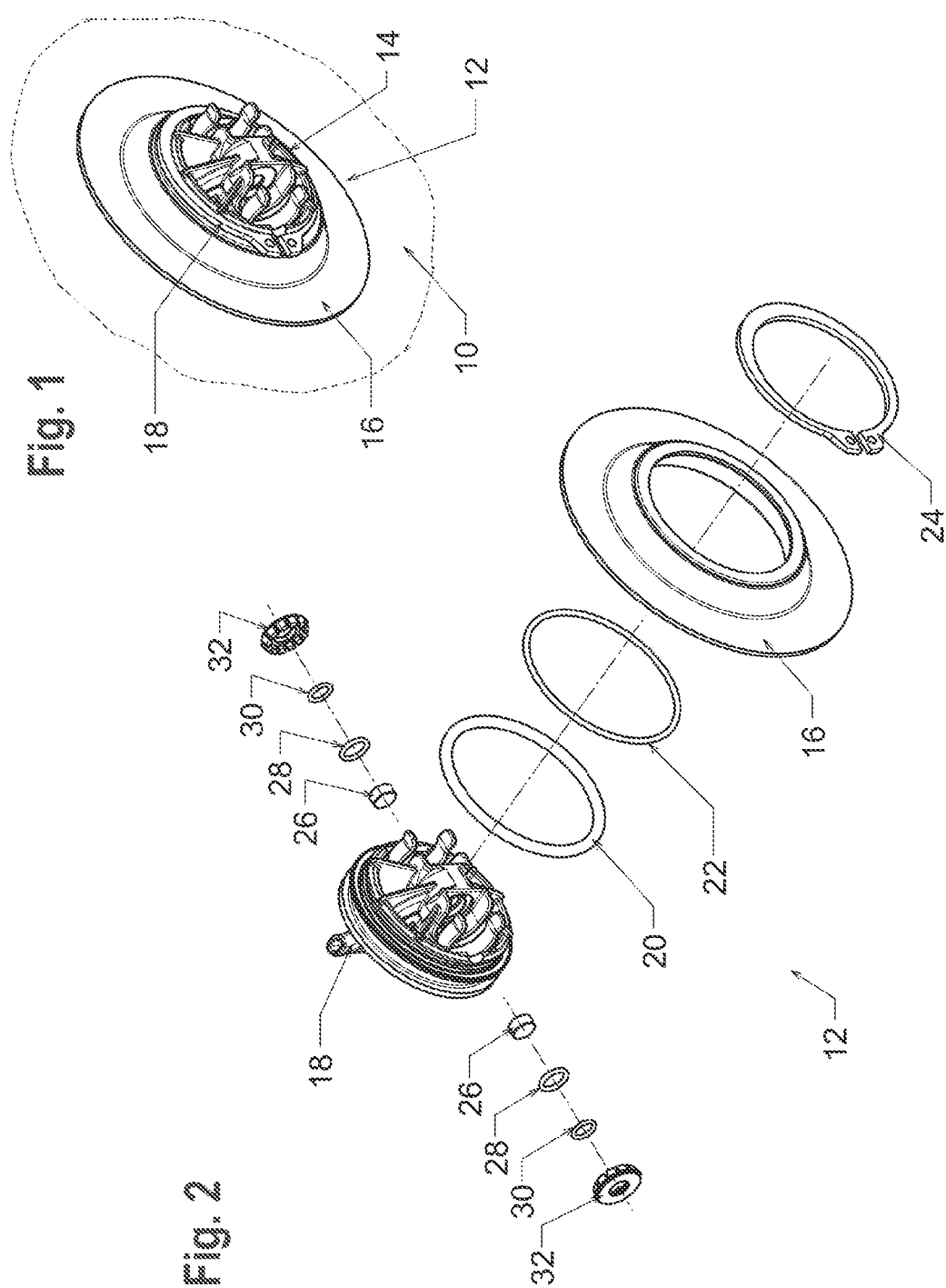

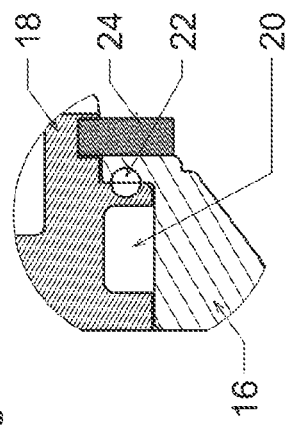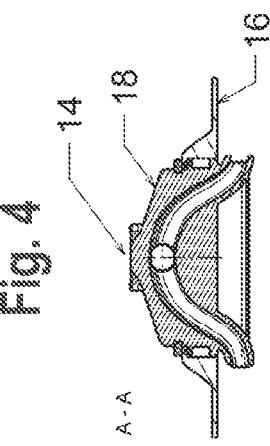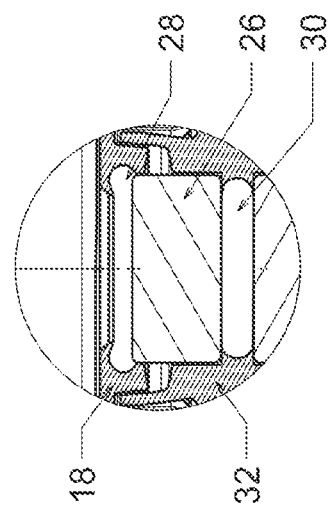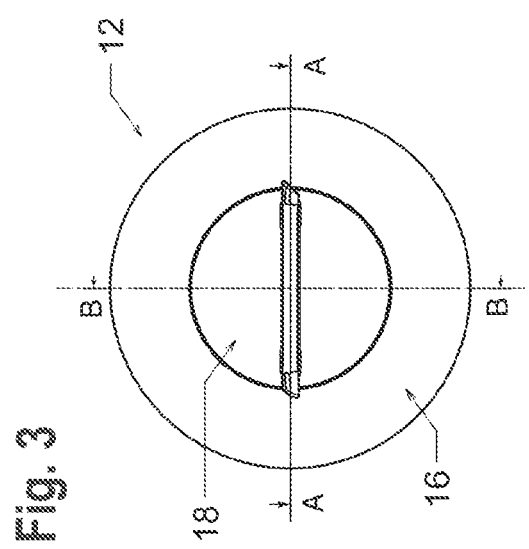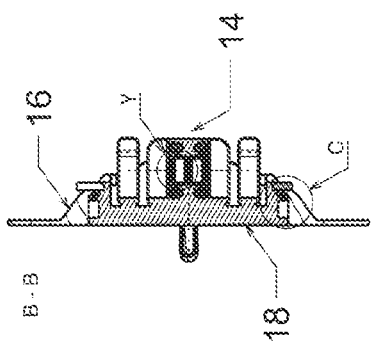

DISPOSABLE PORT DEVICE FOR CONNECTING A FUNCTIONAL UNIT TO A FLEXIBLE WALL OF A DISPOSABLE CONTAINER AND METHOD OF MANUFACTURING A DISPOSABLE PORT DEVICE

FIELD OF THE INVENTION

The invention relates to a disposable port device for connecting a functional unit to a flexible wall of a disposable container. The invention further relates to a method of manufacturing a disposable port device.

BACKGROUND OF THE INVENTION

Particularly in the pharmaceutical and biotechnological industries, for the production, storage and use of fluids (liquids and gases), disposable containers having flexible walls are used instead of the previously more commonly used rigid tanks and cylinders made of stainless steel, for example. Such disposable or single-use containers will be referred to here as bags for the sake of simplicity. As in the case of rigid containers, taking samples of the fluids in the bags and monitoring of a wide variety of parameters of the fluids is necessary. To this end, it is known to use sensors protruding through a window in the bag wall into the interior of the bag.

For example, DE 10 2015 122 745 B3 discloses a bag with a housing of an optical measuring cell projecting into the interior of the bag. The measuring cell housing has a measuring gap which is defined by two side surfaces opposite one another at a distance and a connecting surface connecting the side surfaces. The side surfaces each have an optical window, and optical fibres are mounted in front of the windows, respectively. The measuring cell housing has receiving channels upstream of the windows for receiving the optical fibers. The receiving channels can subsequently be fitted with the optical fibers from the outside. The measuring cell housing with the windows and receiving channels is firmly connected to the wall of the bag.

For reasons of costs as well as sterilization, the sensor, or at least the part of the sensor interacting with, or influenced by, the fluid to be monitored, is formed as a disposable element which is delivered to the customer firmly connected to the bag. Thus, the bag and the sensor (part) can be sterilized together, either by the manufacturer before delivery or by the customer before the actual use. After being used, the bag is disposed together with the sensor (part).

In order to attach a sensor or other components to a bag, a suitable port needs to be integrated into the flexible wall of the bag. However, the pressure of the fluid in the bag causes a curvature of the bag foil, and possibly of the port, resulting in material stress.

SUMMARY OF THE INVENTION

It is an object of the invention to overcome the shortcomings and disadvantages of past achievements, especially in view of an easy manufacturing and a high reliability of the connection between the port and the bag on the one hand, and in view of a high flexibility with respect to the type of sensor to be used on the other hand.

The invention provides a disposable port device comprising the features of claim 1. Advantageous and expedient embodiments of the disposable port device according to the invention are apparent from the associated dependent claims.

The disposable port device according to the invention is intended for connecting a functional unit to a flexible wall of a disposable container. The disposable port device comprises a flange to be connected to the flexible wall of the disposable container and an insert providing or receiving the functional unit. The flange and the insert are separate parts made from different materials with different material characteristics.

In terms of the invention, "disposable" means intended for a single use. The person skilled in the biotechnical field is able to differentiate between single-use components, which are usually made from sterilizable plastic materials, and common multi-use components, e.g. stainless steel tanks, which are cleaned and sterilized for re-use.

The invention is based on the finding that the use of two different materials enables the port device according to the invention to meet the different high demands, especially with respect to avoiding material stress in the area where the port is connected to the flexible wall of the disposable container on the one hand, and providing a rigid and reliable support for any functional unit on the other hand. This is explained in more detail below.

The foil of the disposable container (bag) is flexible and takes a curved shape when filled with a fluid. If a stiff material is used for a port in the foil, the shape of the port does not easily follow the curvature of the foil. Accordingly, the relative material stress may cause a tear in the foil or a crack in the port, resulting in a leakage. Therefore, flexible materials may be beneficial for the interface between the port and the bag. However, the functional unit employed at the port usually requires a rugged material which does not change its geometry when the bag is filled. Furthermore, in the majority of cases the ports are attached to the bag surface by welding, and there are only few materials that can be properly welded on a bag foil. Unfortunately, these materials are usually not suitable for other manufacturing techniques and/or they are unusable under special conditions. For example, polyethylene (PE) can be welded, but it cannot be easily glued or used with rapid prototyping.

The invention provides a solution to the above problems without the need of making compromises. The basic concept of the invention is to split the port into two separate members made from different materials with different material characteristics. While the outer flange of the port device according to the invention can be made from a meltable material for welding, or from a material suitable for gluing, to the bag foil, the insert can be made from a more rigid material in order to provide a proper support for the functional unit. The material of the insert can be freely chosen as it does not have to fulfill the requirements of the port flange. The same is true vice versa.

The port device according to the invention can serve as a universal port for applying different functional units. The flange can always have the same design and be pre-attached to the bag wall. The flange can receive different inserts or inserts with different functional units as long as the connection between the flange and the insert is universal. This reduces the need of qualification whenever the same platform is used for newly developed sensors or other functional units. Only the insert has to be adapted to the respective functional unit.

In order to fulfill the common requirements of a port as explained above, it is advisable to choose the different materials such that the material of the insert is harder than the material of the flange.

A preferred flange material is polyethylene, especially low-density polyethylene, due to its flexibility and weldability.

Among the preferred insert materials are the following: metal, thermoplastic, thermosetting polymer, resins.

According to a preferred embodiment of the invention, the flange is basically ring-shaped and the insert is basically disc-shaped, the shape of the flange being adapted to receive the insert. Thus, the insert with the functional unit is completely surrounded by the flange. In this context, "basically ring-shaped" and "basically disc-shaped" shall encompass designs with axial protrusions.

There are several options of connecting the insert to the flange. One of the preferred options is a clamping mechanism. An advantage of a clamping mechanism is that no joining of materials is necessary as with welding, gluing or bonding.

The clamping mechanism may include a retaining ring which, when fixed, urges the flange against the insert or vice versa. The retaining may be omitted, e.g. in case of an integrated clipping function, a frictional fit and/or when a satisfactory connection is obtained, or at least supported, by the pressure exerted by the fluid in the container on the insert against the flange.

Proper sealing of the port device is important. To this end, it is preferred to provide both a radially acting gasket and an axially acting gasket.

The radially acting gasket may be formed by a first O-ring arranged between opposite radial surfaces of the flange and the insert.

The axially acting gasket may be formed by a second O-ring arranged between opposite axial surfaces of the flange and the insert The functional unit to be attached to the disposable container can be any useful device or portion thereof and may include at least one of the following or at least a relevant portion thereof: a sensor, a sensor assembly, a fluid transfer unit, a sampling unit, a hose barb, a baffle, a membrane, an analytical interface.

According to a specific embodiment of the invention, the functional unit is an optical sensor unit including a partially transmissive material, preferably a material transmissive in a wavelength range of 190 to 2500 nm. Such materials include, for example, fused quartz and borosilicate glass (BK7).

The partially transmissive material can also be sapphire. Accordingly, the optical sensor unit could include a sapphire disc in practice.

Generally, that the functional unit is not limited to a single functionality. The functional unit may also provide more than one functionality at the same time or multiple times the same kind of functionality.

The invention also provides a disposable container comprising a flexible wall and a disposable port device as described above, the port device being integrated into the flexible wall.

Since there are established and approved techniques for connecting certain flange materials with a foil or the like, the flange of the port device should be directly attached, preferably welded or glued, to the flexible wall.

The invention further provides a method of manufacturing a disposable port device according to the invention. The method comprises the steps of: producing the flange from a first material; producing the insert from a different second material, the first and second materials having different material characteristics; and connecting the insert to the flange.

The insert of the port device can be produced by 3D printing, machining or molding. Each of these forming methods is precise enough and suitable for series production.

According to a particular aspect of the invention, the flange and the insert can be produced by the same technique, preferably in the same process, from a different material.

It is possible to produce the flange by injection molding from a first material and to produce the insert by 3D printing or by injection molding or overmolding from a second material.

In case the flange and the insert are produced separately and the flange is first attached to the flexible container wall, the insert is preferably mounted to the flange from the inside of the disposable container.

BRIEF DESCRIPTION OF THE DRAWINGS

Further features and advantages of the invention will become apparent from the following description and from the accompanying drawings to which reference is made. In the drawings:

FIG. 1 shows a perspective view of a disposable port device according to the invention for connecting a functional unit to a flexible wall of a disposable container;

FIG. 2 shows an exploded view of the port device of FIG. 1;

FIG. 3 shows a bottom view of the port device of FIG. 1;

FIG. 4 shows a sectional view of the port device along intersection line A-A of FIG. 3;

FIG. 5 shows a sectional view of the port device along intersection line B-B of FIG. 3;

FIG. 6 shows an enlarged view of detail C of FIG. 5; and

FIG. 7 shows an enlarged view of detail Y of FIG. 5.

DETAILED DESCRIPTION OF THE INVENTION

A portion of a flexible wall 10 of a disposable container is shown in FIG. 1. The disposable container will be referred to here as bag for the sake of simplicity. The flexible wall 10 is typically made of a foil and surrounds at least a portion of the interior of the bag. A disposable port device 12 is integrated into the flexible wall 10 and accommodates a functional unit 14. In the embodiment shown in the drawings the functional unit 14 is a sensor unit, in particular an optical sensor unit for spectroscopy. However, as will be explained further below, the functional unit 14 can provide other functionalities, more than one functionality at the same time or multiple times the same functionality.

The individual components of the port device 12 and the optical sensor unit are apparent from the exploded view of FIG. 2. The main components of the port device 12 are a ring-shaped flange 16 and a separate insert 18. Further components of the port device 12 are two O-rings 20, 22 and a retaining ring 24. The optical sensor unit includes two sets of the following components: a sapphire disc 26, two O-rings 28, 30, and a locking ring 32.

The outer ring-shaped flange 16 of the port device 12 is made of a meltable material for welding to the flexible wall 10 of the bag, in particular to an edge of a window provided in the flexible wall 10. The preferred material for the flange 16 in view of the preferred welding connection is PE (polyethylene), especially LDPE (low-density polyethylene). As an alternative, the flange 16 may be glued or otherwise mechanically attached to the flexible wall 10.

The inner shape of the flange 16 is adapted to receive the basically disc-shaped insert 18. A first side of the insert 18, which is visible in FIGS. 1 and 2, will be referred to as the top side, while the opposite second side, which is visible in FIG. 3, will be referred to as the bottom side.

The insert 18 is either designed to provide a certain functionality or designed to receive a separate functional unit 14. Typical examples of the functional unit 14 include a variety of sensors or sensor assemblies, especially for measuring pH, dO (dissolved oxygen), temperature, capacitance, conductivity, as well as fluid transfer units, sampling units (ports for extracting samples), hose barbs, baffles, membranes and interfaces to spectroscopy or other analytical techniques. As mentioned before, the functional unit 14 can provide a single functionality, more than one functionality at the same time or multiple times the same kind of functionality. In the context of the present invention, the term "functional unit" shall also encompass a relevant portion of a functional device or assembly, e.g. a detection element of a sensor assembly.

The insert 18 is manufactured by 3D printing, machining, molding or another suitable forming technique. Preferred materials for the insert 18 are metals, thermoplastics, thermosetting polymers, resins. In most applications the insert 18 is less flexible (i.e. harder) than the flange 16.

It is generally possible to manufacture the flange 16 and the insert 18 using the same technique, potentially in the same process. For example, 3D printing allows usage of two or more materials within the same printing process. Multi-component injection molding or overmolding are also possible options for jointly manufacturing the flange 16 and the insert 18.

As can be seen in FIGS. 4, 5 and 6, the insert 18 is connected with the flange 16 via the first O-ring 20 forming a radially acting gasket, the second O-ring 22 forming an axially acting gasket, and the retaining ring 24 forming a clamping mechanism for keeping the main components of the port device 12 together. In the assembling process, the insert 18 is mounted to the flange 16, which is already connected to the flexible wall 10 of the bag, from the inside of the bag so that the top side of the insert 18 faces the bag interior and the bottom side faces the bag exterior.

The insert 18 may be mounted to the flange 16 without a retaining ring. In this case it is the pressure of the fluid inside the bag that presses the insert 18 against the axially acting gasket (second O-ring 22) and prevents detachment of the insert 18 from the flange 16. Generally, a higher pressure improves the functionality of the gaskets and the strength of the connection. Other options of a clamping mechanism for fixing the insert 18 to the flange 16 include a system of clamps and/or snap/latch locks or a bayonet mount.

With the above-explained split concept of the port device the design of the flange 16 can remain unchanged while the design of the insert 18 can be adapted to the design of the functional unit 14 to be received.

Regarding the specific optical sensor unit employed in the embodiment shown in the drawings, the setup and the sealing of the optical sensor unit is apparent from FIGS. 1 and 7. The sapphire discs 26 are held in place by the locking rings 32. While the O-rings 28 facing the measuring gap of the optical sensor unit are received behind a circular protrusion of the insert 18, the O-rings 30 on the other sides of the sapphire discs 26 are exposed to the pressure of the fluid in the bag. Thus, the sapphire discs 26 are clamped between the O-rings 28 and 30 and are sealed well.

The main application of the split port device 12 is to provide an appropriate port for bioreactors (with or without stirring or rocking motion equipment), mixing bags, or any other single-use container having a flexible wall where a sensor or another functional unit is required.

LIST OF REFERENCE NUMERALS

10 bag wall
12 port device
14 functional unit
16 flange
18 insert
20 O-ring
22 O-ring
24 retaining ring
26 sapphire disc
28 O-ring
30 O-ring
32 locking ring

The invention claimed is:

1. A disposable port device for connecting a functional unit to a flexible wall of a disposable container, comprising:
    a functional unit, being one of a sensor, a sensor assembly, a fluid transfer unit, a hose barb, a baffle, a membrane, or an analytical interface;
    a flange to be connected to the flexible wall of the disposable container; and
    an insert providing or receiving the functional unit, the flange and the insert being separate parts made from different materials with different material characteristics,
    wherein the material of the insert is harder than the material of the flange, and wherein the material of the flange is low-density polyethylene.

2. The disposable port device according to claim 1, characterized in that the material of the insert includes at least one of: metal, thermoplastic, thermosetting polymer, or resins.

3. The disposable port device according to claim 1, characterized in that the flange is ring-shaped and the insert is disc-shaped, the shape of the flange being adapted to receive the insert.

4. A disposable port device for connecting a functional unit to a flexible wall of a disposable container, comprising:
    a functional unit being optical sensor unit including a partially optically transmissive material;
    a flange to be connected to the flexible wall of the disposable container; and
    an insert providing or receiving the functional unit, the flange and the insert being separate parts made from different materials with different material characteristics.

5. The disposable port device according to claim 4, characterized in that the partially optically transmissive material is sapphire.

6. The disposable port device according to claim 1, characterized in that the functional unit provides a single functionality or more than one functionality at a same time or multiple times a same kind of functionality.

7. A disposable container, comprising the flexible wall and the disposable port device according to claim 1, the port device being integrated into the flexible wall.

8. The disposable container according to claim 7, characterized in that the flange of the port device is directly attached to the flexible wall.

9. The disposable port device according to claim 4, wherein the partially transmissive material is transmissive in a wavelength range of 190 to 2500 nm.

10. The disposable port device according to claim 5, wherein the optical sensor unit includes a sapphire disc.

11. The disposable container according to claim 8, wherein the flange of the port device is welded or glued to the flexible wall.

12. A disposable container, comprising the flexible wall and the disposable port device according to claim 4, the port device being integrated into the flexible wall.

13. The disposable port device according to claim 4, wherein the material of the insert is harder than the material of the flange, and wherein the material of the flange is low-density polyethylene.

14. The disposable port device according to claim 13, wherein the material of the insert includes at least one of: metal, thermoplastic, thermosetting polymer, or resins.

* * * * *